(12) United States Patent
Gunnarsson et al.

(10) Patent No.: US 10,945,122 B2
(45) Date of Patent: Mar. 9, 2021

(54) NETWORK NODE, COMMUNICATION DEVICE AND METHOD FOR IDLE MODE POSITIONING CONFIGURATION

(71) Applicant: Telefonaktiebolaget LM Ericsson (publ), Stockholm (SE)

(72) Inventors: Fredrik Gunnarsson, Linköping (SE); Iana Siomina, Täby (SE); Martin van der Zee, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/605,528

(22) PCT Filed: May 4, 2018

(86) PCT No.: PCT/SE2018/050464
§ 371 (c)(1),
(2) Date: Oct. 16, 2019

(87) PCT Pub. No.: WO2018/203819
PCT Pub. Date: Nov. 8, 2018

(65) Prior Publication Data
US 2020/0053555 A1  Feb. 13, 2020

Related U.S. Application Data

(60) Provisional application No. 62/501,882, filed on May 5, 2017.

(51) Int. Cl.
*H04W 24/00* (2009.01)
*H04W 8/24* (2009.01)
(Continued)

(52) U.S. Cl.
CPC .............. *H04W 8/24* (2013.01); *H04W 24/10* (2013.01); *H04W 64/00* (2013.01)

(58) Field of Classification Search
USPC .......................... 455/456.1–456.6, 457, 466
See application file for complete search history.

(56) References Cited

U.S. PATENT DOCUMENTS

| 2010/0273506 A1* | 10/2010 | Stern-Berkowitz ......................... G01S 5/0009 455/456.1 |
| 2012/0092998 A1* | 4/2012 | Chang ................... H04W 24/10 370/241 |

(Continued)

FOREIGN PATENT DOCUMENTS

| EP | 2809090 A1 | 12/2014 |
| WO | 2010147525 A1 | 12/2010 |

OTHER PUBLICATIONS

Unknown, Author, "3rd Generation Partnership Project; Technical Specification Group Radio Access Network; Evolved Universal Terrestrial Radio Access (E-UTRA); User Equipment (UE) procedures in idle mode (Release 10)", 3GPP TS 36.304 V10.6.0, Jun. 2012, pp. 1-33.

(Continued)

*Primary Examiner* — Matthew W Genack
(74) *Attorney, Agent, or Firm* — Murphy, Bilak & Homilier, PLLC

(57) ABSTRACT

A wireless communication device (330) and method therein for performing positioning related measurement during idle mode in a wireless communication networks (300) are disclosed. The wireless communication device (330) is capable of wireless communication with at least a first network node (320) in a first cell (310). The wireless communication device (330) obtains information on a specific configuration associated with positioning measurements to be performed in idle mode. The wireless communication device (330) performs positioning related measurements based on the obtained information and pro- (Continued)

vides (430) the positioning related measurements to the first network node.

14 Claims, 8 Drawing Sheets

(51) Int. Cl.
*H04W 24/10* (2009.01)
*H04W 64/00* (2009.01)

(56) References Cited

U.S. PATENT DOCUMENTS

2017/0064593 A1* 3/2017 Khay-Ibbat ............ H04W 36/30
2019/0297595 A1* 9/2019 Sirotkin ............... H04W 64/003
2019/0349881 A1* 11/2019 Choi ..................... G01S 5/0236

OTHER PUBLICATIONS

Unknown, Author, "3rd Generation Partnership Project; Technical Specification Group Radio Access Network; Evolved Universal Terrestrial Radio Access (E-UTRA); User Equipment (UE) procedures in idle mode (Release 14)", 3GPP TS 36.304 V14.2.0, Mar. 2017, pp. 1-49.

Unknown, Author, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 14)", 3GPP TS 36.305 V14.1.0, Mar. 2017, 1-78.

* cited by examiner

NETWORK NODE, COMMUNICATION DEVICE AND METHOD FOR IDLE MODE POSITIONING CONFIGURATION

TECHNICAL FIELD

Embodiments herein relate to a network node, a communication device and methods therein for positioning measurements. In particular, they relate to positioning measurements for Internet of Things (IoT) devices in a wireless communication network.

BACKGROUND

Wireless communication networks, such as Global System for Mobile Communications (GSM), Universal Mobile Telecommunications System (UMTS), Wideband Code Division Multiple Access (WCDMA) or High Speed Packet Access (HSPA), 3G Long Term Evolution (LTE), usually cover a geographical area which is divided into cell areas. Each cell area is served by a base station, which may also be referred to as a network node (NW), eNodeB (eNB), an access node, an access point etc. A wireless communication network may include a number of cells that can support communications for a number of wireless communication devices, such as user equipment (UE). Each cell or NW node may use certain carrier frequencies and cover certain system bandwidth. The NW node serves a wireless communication device via a communication link, which may be referred to as a serving or controlling node, cell, beam, sector etc.

The Internet of Things (IoT) is a vision for the future world where everything that can benefit from a connection will be connected. Cellular technologies are being developed or evolved to play an indispensable role in the IoT world, particularly machine type communication (MTC). MTC is characterized by lower demands on data rates than for example mobile broadband, but with higher requirements on e.g. low cost device design, better coverage, and ability to operate for years on batteries without charging or replacing the batteries. To meet the IoT design objectives, 3rd Generation Partnership Project (3GPP) has standardized Narrowband IoT (NB-IoT) in Release 13 that has a system bandwidth of 180 kHz and targets improved coverage, long battery life, low complexity communication design, and network capacity that is sufficient for supporting a massive number of devices.

To further increase the market impact of NB-IoT, improving narrowband support for positioning has been agreed to be a key aspect of NB-IoT in standard Release 14. The enhancement will be designed to maintain the ultra-low cost and complexity of the Rel-13 NB-IoT UE where appropriate, as well as the coverage and capacity of the NB-IoT network.

Location-based services and emergency call positioning drives the development of positioning in wireless communication networks and a plethora of applications and services in terminals take advantage of the positioning. Positioning in LTE is supported by the architecture shown in FIG. 1, with direct interactions between a UE 110 and a location server Evolved Serving Mobile Location Center (E-SM LC) 120 via the LTE Positioning Protocol (LPP). Moreover, there are also interactions between the location server 120 and the eNodeB 130 via the LPPa protocol, to some extent supported by interactions between the eNodeB 130 and the UE 110 via the Radio Resource Control (RRC) protocol. Mobility Management Entity (MME) 140 is responsible for idle mode UE 110 paging and tagging procedure including retransmissions. It also provides control plane function for mobility. The Gateway Mobile Location Centre (GMLC) 150 contains functionality required to support Location-based Service (LBS).

The following positioning techniques are considered in LTE (3GPP 36.305):

Enhanced Cell ID: Essentially cell ID information is used to associate the UE to the serving area of a serving cell, and then additional information is used to determine a finer granularity position.

Assisted Global Navigation Satellite System (GNSS): GNSS information retrieved by the UE is used for positioning, supported by assistance information provided to the UE from E-SM LC.

Observed Time Difference of Arrival (OTDOA): The UE estimates the time difference of reference signals from different base stations and sends to the E-SMLC for multilateration.

Uplink TDOA (UTDOA): The UE is requested to transmit a specific waveform that is detected by multiple location measurement units, e.g. an eNB, at known positions. These measurements are forwarded to E-SMLC for multilateration.

In a general scenario illustrated by FIG. 2, a UE A 210 is served or controlled by a serving or controlling node 220. In addition, it can possibly detect a signal from one or more non-serving or non-controlling nodes 230. The UE 210 can be configured to estimate signal quality from the serving/controlling node 220 as well as non-controlling/non-serving nodes 230 to support enhanced cell identity (E-CID) positioning technique.

For NB-IoT, the UE will wait with positioning measurements until the controlling node 220 has released the UE to idle mode. Once the measurements are complete or a response time provided to the UE 210 is about to expire, the UE 210 reconnects to the network node 220 to provide the measurements.

The normal operation in idle mode is to configure the UE 210 to avoid measuring on alternative or non-serving or neighbor nodes/cells provided that the currently selected node, at which the UE 210 is camping on, is good enough. The measurement procedure is based on signal strength (Srxlev) and quality (Squal) measurements, as well as configured thresholds, $S_{IntraSearchP}$ and $S_{nonIntraSearchP}$.

According to the idle mode cell reselection procedure in 3GPP 36.304, when evaluating Srxlev and Squal of non-serving cells for reselection purposes, the UE 210 shall use parameters provided by the serving cell.

Following rules are used by the UE 210 to limit needed measurements:

If the serving cell fulfils Srxlev>$S_{IntraSearchP}$, the UE 210 may choose not to perform intra-frequency measurements.

Otherwise, the UE 210 shall perform intra-frequency measurements.

The UE 210 shall apply the following rules for NB-IoT inter-frequencies measurements which are indicated in system information:

If the serving cell fulfils Srxlev>$S_{nonIntraSearchP}$, the UE 210 may choose not to perform inter-frequency measurements.

Otherwise, the UE 210 shall perform inter-frequency measurements.

The thresholds $S_{IntraSearchP}$ and $S_{nonIntraSearchP}$ are broadcasted in System Information Block 3 (SIB3), typically configured to avoid unnecessary measurements for energy efficient operation.

In addition, the UE 210 may request, from the network, different discontinuous reception (DRX) or evolved DRX (eDRX) configurations, meaning that the UE 210 will differently often monitor the network for paging etc. when in idle mode with the purpose to save battery.

In the existing solution, during normal idle mode operation, the device preferably shall avoid measurements in idle mode unless it is considered vital for the cell reselection. Both the cell reselection parameters and the DRX and eDRX configurations aim at avoiding measurements and monitoring of the UE 210 in order to save battery. However, this also means that when the UE 210 is released to idle mode with the purpose to perform positioning measurements, the configurations may result in the UE 210 not measuring during a large portion of the allowed response time due to the DRX/eDRX configuration and/or even not measuring neighbor cells due to a sufficiently strong camping cell. This will lead to inadequate measurements for positioning.

SUMMARY

It is therefore an object of embodiments herein to provide an improved apparatus and method for positioning related measurements during idle mode in a wireless communication network.

According to a first aspect of embodiments herein, the object is achieved by a method performed in a wireless communication device for positioning related measurements in a wireless communication networks. The wireless communication device is capable of wireless communication with at least a first network node in a first cell. The wireless communication device obtains information on a specific configuration associated with positioning measurements to be performed in idle mode. The wireless communication device performs positioning related measurements based on the obtained information and provides positioning related measurements to the first network node.

According to a second aspect of embodiments herein, the object is achieved by a wireless communication device for positioning related measurements in a wireless communication networks. The wireless communication device is capable of wireless communication with at least a first network node in a first cell. The wireless communication device is configured to obtain information on a specific configuration associated with positioning measurements to be performed in idle mode. The wireless communication device is further configured to perform positioning related measurements based on the obtained information and provide positioning related measurements to the first network node.

According to a third aspect of embodiments herein, the object is achieved by a method performed in a network node for positioning of a wireless communication device during idle mode in a wireless communication networks. The network node receives a request for positioning of a wireless communication device. The network node configures a specific configuration associated with positioning measurements to be performed in idle mode for the wireless communication device. The network node sends the specific configuration to the wireless communication device.

According to a fourth aspect of embodiments herein, the object is achieved by a network node for positioning of a wireless communication device during idle mode in a wireless communication networks. The network node is configured to receive a request for positioning of a wireless communication device and configure a specific configuration associated with positioning measurements to be performed in idle mode for the wireless communication device. The network node is further configured to send the specific configuration to the wireless communication device.

According to some embodiments, the specific configuration associated with positioning measurements may comprise specific DRX configuration and/or specific cell reselection measurement criteria or non-serving cell evaluation criteria.

According to some embodiments, the wireless communication device obtains information on a specific configuration by obtaining an indication from the first network node to neglect cell reselection measurement criteria thresholds in system information block broadcasted from the first network node.

According to some embodiments, the wireless communication device obtains information on a specific configuration by obtaining specific cell reselection measurement criteria thresholds from the first network node.

According to some embodiments, the wireless communication device may obtain the information, indication, thresholds via LPP protocol or RRC before a release of a connection.

According to some embodiments, the specific configuration may be pre-configured 35 to the wireless communication device and comprises any one of:

(a) neglecting cell reselection measurement criterion in system information block broadcasted from the first network node;

(b) a specific set of cell reselection measurement criterion thresholds.

According to some embodiments, the specific configuration may be pre-configured to the wireless communication device and comprising neglecting any DRX/eDRX configurations in idle mode during positioning measurements.

According to some embodiments, the wireless communication device obtains information on a specific configuration by obtaining an indication from the first network node to neglect any DRX/eDRX configurations.

According to some embodiments, the wireless communication device obtains information on a specific configuration by obtaining specific DRX/eDRX configurations from the first network node.

According to some embodiments, the specific DRX/eDRX configurations may be obtained via LPP protocol or from MME via the first network node before release of a connection.

The embodiments herein provide specific configuration for handling of measurement procedures for a wireless communication device during idle mode in case the wireless communication device was released to idle mode with the purpose of performing positioning measurements during a configured response time. The specific configuration associated with positioning measurements may comprise specific DRX configuration and/or specific cell reselection measurement criteria or non-serving cell evaluation criteria. The specific configuration may be neglecting the cell reselection measurement criterion and always measuring neighbor cells or may be a specific set of cell reselection measurement criterion thresholds. These thresholds may be set to infinity, which may require the wireless communication device always doing non-serving cell measurements.

The specific configuration may be neglecting any DRX/eDRX configurations in idle mode during positioning measurements and always measuring and monitoring cells while in idle mode for the purpose of positioning measurements. The specific configuration may also provide a DRX/eDRX configuration that essentially excludes DRX or minimizes the periodicity of DRX or eDRX.

Therefore the embodiments herein guarantee that the wireless communication device is fully committed to positioning related measurements of both serving and no-serving cells during the measurement time for positioning in a wireless communication network. The embodiments herein avoid an inefficient and insufficient measurement period for positioning during the response time in idle mode.

BRIEF DESCRIPTION OF THE DRAWINGS

Examples of embodiments herein are described in more detail with reference to attached drawings in which.

DETAILED DESCRIPTION

Embodiments herein will provide a specific configuration for handling of measurement procedures during idle mode for a wireless communication device in case the wireless communication device is released to idle mode with the purpose of performing positioning measurements possibly during a configured response time.

Figure 1:
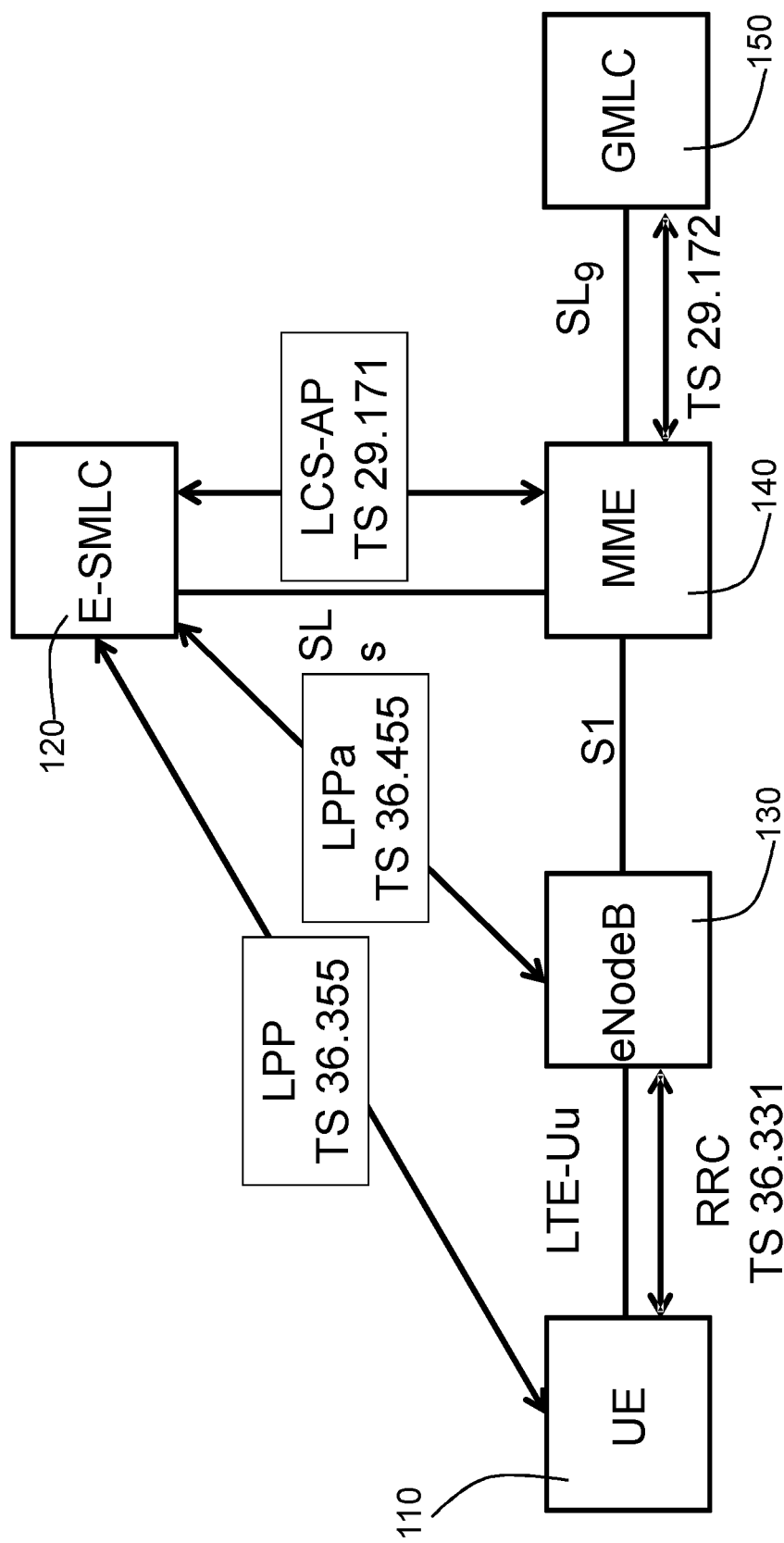
FIG. 1 is a schematic block diagram illustrating an LTE positioning architecture.
Figure 2:
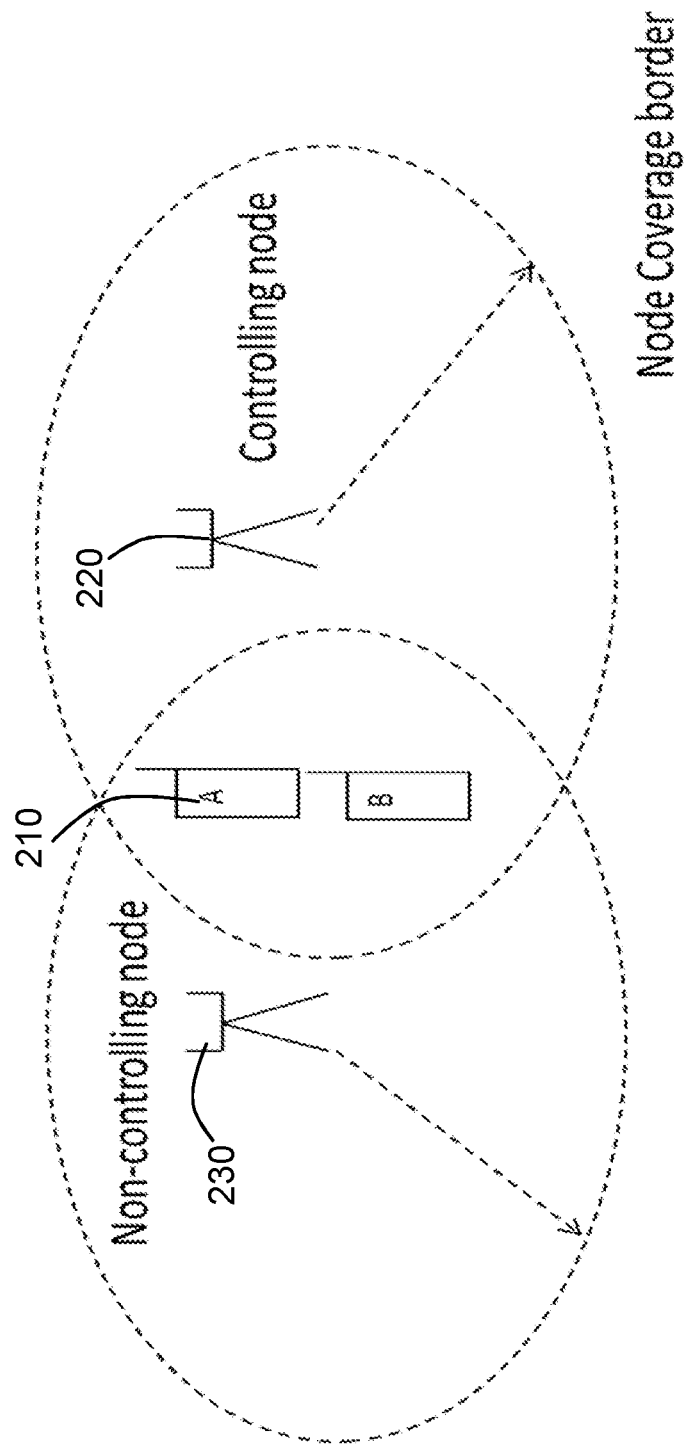
FIG. 2 is a schematic block diagram illustrating a general scenario where UE is served by a controlling node in a communication network.
Figure 3:
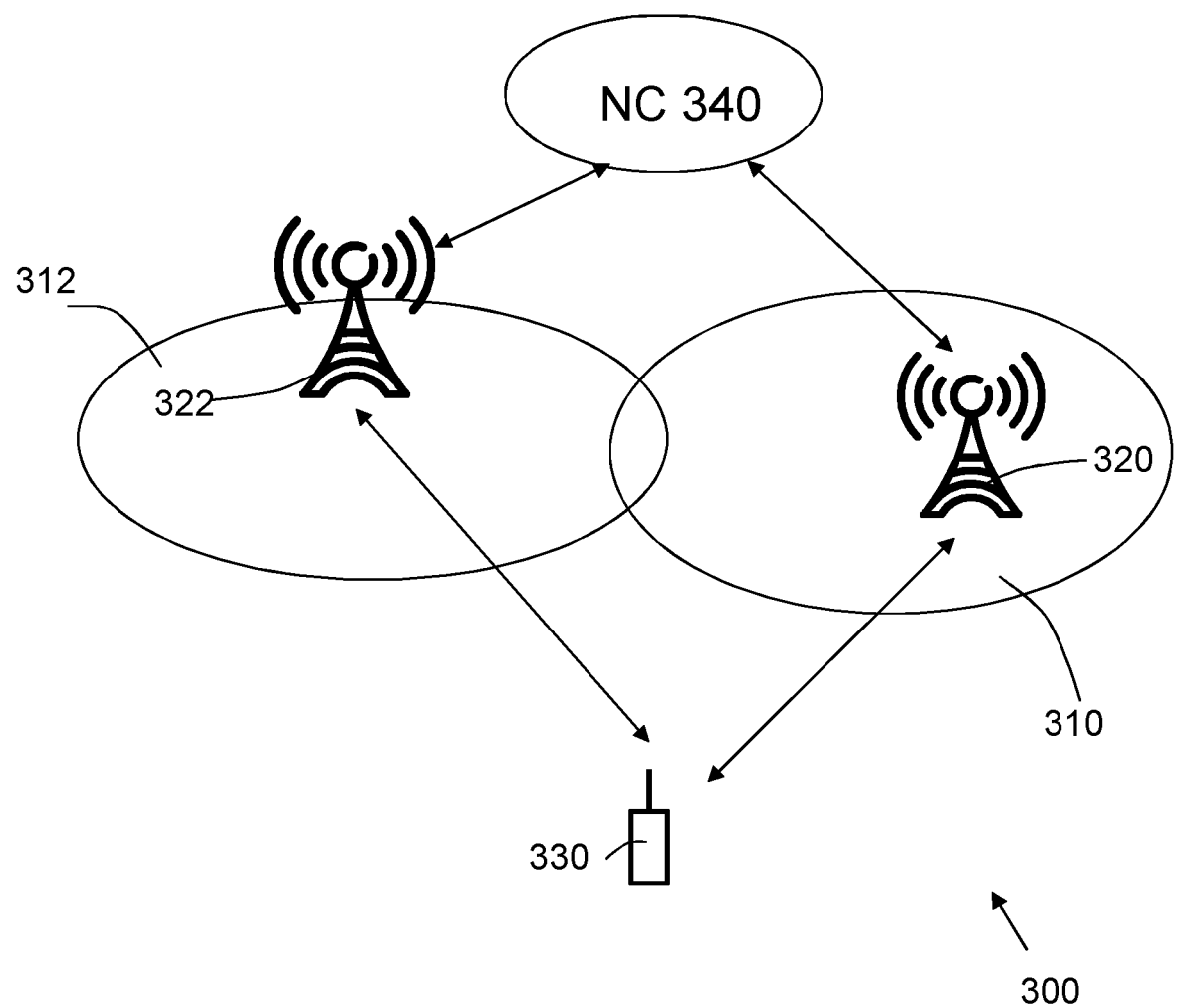
FIG. 3 is a schematic block diagram illustrating embodiments of a wireless communication network.

FIG. 3 depicts an example of a wireless communication network 300 in which embodiments herein may be implemented. The wireless communication network 300 may be any wireless system or cellular network, such as GSM network, a Long Term Evolution (LTE) network, any $3^{rd}$ Generation Partnership Project (3GPP) cellular network, Worldwide interoperability for Microwave Access (Wimax) network, Wireless Local Area Network (WLAN/Wi-Fi), a Fourth Generation (4G) network, a Fifth Generation (5G) cellular network or New Radio (NR) network etc.

The wireless communication network 300 comprises a plurality of cells whereof two, a first cell 310 comprising a first Access Node (AN) 320 and a second cell 312 comprising a second Access Node 322, are depicted in FIG. 3. The first Access Node 320 serves the first cell 310, while the second Access Node 322 serves the second cell 312. The first Access Node 320, the second Access Node 322 are network access nodes which each may be, for example, an eNB, gNB, eNodeB, gNodeB or a Home Node-B, Home eNode-B, Home gNode-B, or an access point.

For the sake of easier understanding by the reader, the term "cell" has been used above. However, spatial division between operation areas of a network node may be based on other entities, such as sectors, beams, etc. Sectors are statically defined directions from an antenna of the network node and beams are dynamically defined directions from an antenna of the network node. Thus, for any disclosure herein where the term "cell" is used, the demonstrated principles are equally feasible for sectors, beams, etc., unless explicitly or implicitly expressed otherwise.

The wireless communication network 300 may further comprise a Network Controller 340 which communicates with the first and second access nodes 320, 322, and acts as a handling unit or a controller for different Radio Access Technologies. The Network Controller 340 may be a separate node as depicted in the figure, or its corresponding functionalities may be incorporated within another network node such as e.g. the Access nodes 320, 322.

A plurality of wireless communication devices operates in the wireless communication network 100, whereof a wireless communication device 330 is depicted. The wireless communication device 330 may be any IoT device, such as an UE, a mobile wireless terminal or a wireless terminal, a mobile phone, a sensor or actuator, a drone with wireless capabilities or any other radio network units capable to communicate over a radio link in a wireless communication network. As shown in FIG. 3, the wireless communication device 330 may communicate with the first and second Access Nodes 320, 322, and the NW node 320 servers or has served the wireless communication device 330 via a communication link, which may be referred to as a serving node, cell, beam, sector etc. In the following, the term "UE" and "wireless communication device" are used interchangeably.

Figure 4:
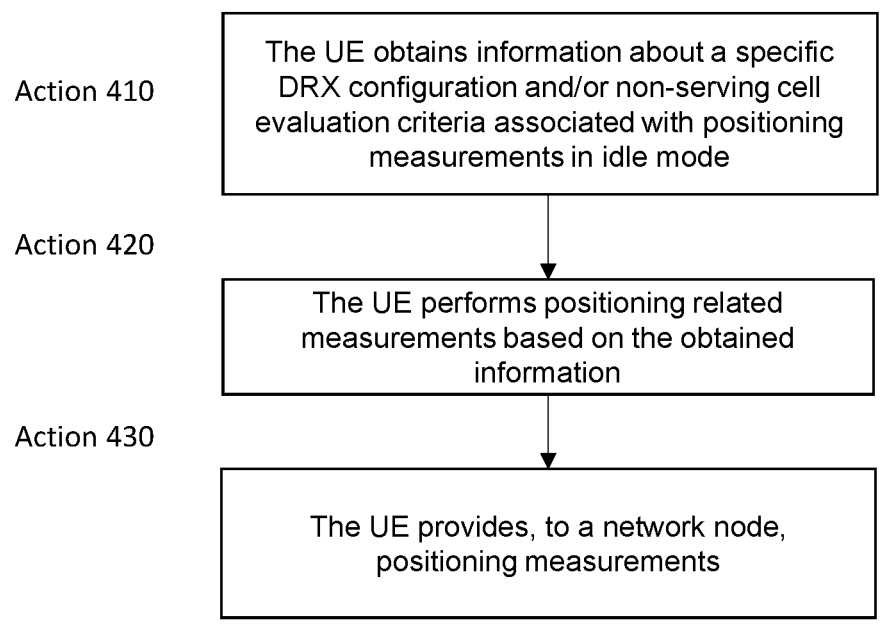
FIG. 4 is a flowchart depicting one embodiment of a method performed in a wireless communication device.

FIG. 4 shows a flow chart of a method performed in a wireless communication device 330 for positioning related measurements during idle mode in the wireless communication networks 300 according to the embodiments herein. It is assumed that the wireless communication device 330 is operating in the wireless communication networks served by a NW node, e.g. the first Access Node 320 in the first cell 310 for communication before it is released to idle mode. The method comprises the following actions, which actions may be taken in any suitable order:

Action 410

The wireless communication device/UE 330 obtains information on a specific configuration associated with positioning measurements to be performed in idle mode.

The specific configuration associated with positioning measurements may be specific DRX configuration and/or specific cell reselection measurement criteria or non-serving cell evaluation criteria.

Cell Reselection Measurement Criteria:

The cell reselection criteria including the thresholds for determining whether non-serving cell measurements are required, is typically retrieved from the system information of the camping cell, e.g. SIB3. These parameters are configured for proper idle mode operation, but may not be suitable for idle mode positioning measurements operation.

According to some embodiments, the UE 330 may be pre-configured to consider an alternative criterion for whether non serving cell measurements are required. Examples of such alternative criteria comprise:

Neglecting the cell reselection measurement criterion and always allowing to measure neighbor cells.

Considering a specific set of cell reselection measurement criterion thresholds. In one embodiment, these thresholds may be set to infinity, which means always requiring non-serving cell measurement.

According to some embodiments, the UE 330 may obtain an indication from a network node, e.g. the network node 320 to neglect the cell reselection measurement criteria thresholds in SIB3 and instead always measure non-serving cells. The indication may in one embodiment obtained via the LPP protocol. In another embodiment, the indication may be obtained via RRC before the release of the connection.

According to some embodiments, the UE 330 may obtain specific thresholds from the network node 320. The specific thresholds shall be used for the cell reselection measurements criteria. In one embodiment, the thresholds are obtained via the LPP protocol. In another embodiment, the thresholds are obtained via RRC before the release of the connection.

The specific thresholds may also be determined by the UE 330, e.g., derived based on a pre-defined rule or based on a default or preconfigured setting configured or optimized for positioning in idle mode.

More generally, the UE 330 may obtain from the network node 320 or determine by itself, a configuration which implicitly or explicitly controls the set of cells to measure for positioning purpose, by setting one or more thresholds, while at the same time preventing the UE 330 to trigger cell reselection procedures.

Drx/Edrx Configuration:

While connected, the UE 330 may request a network node about a DRX or an eDRX configuration. In one embodiment, the UE 330 make a request to the mobility management entity (MME). The MME may be configured to reject the request, or provide a DRX/eDRX configuration that essentially excludes or minimizes the periodicity of DRX or eDRX, or adapt inactivity states configuration to positioning needs, e.g., allow DRX but not eDRX, which in idle mode is a two-level inactivity configuration comprising long, e.g., up to 3 hours, periods each with one Paging Transmission Window (PTW) of a configured length, and where within each PTW the UE 330 operates based on shorter DRX cycles. Allowing DRX but not eDRX for positioning may mean herein that the UE 330 performs positioning measurements based on DRX cycles as if it is not configured with eDRX, even if eDRX can still be used for paging monitoring.

In another example, the UE 330 may perform positioning measurements in idle mode based on DRX configuration but suspend or delay when it needs to receive paging, e.g., positioning related measurements may be performed between PTWs but not inside PTWs when the UE 330 receives paging.

In another embodiment, the UE 330 may be pre-configured to neglect any DRX/eDRX configurations in idle mode during positioning related measurements.

In another embodiment, the UE 330 may obtain an indication from a network node to neglect the DRX/eDRX configurations and instead always measure and monitor cells while in idle mode for the purpose of positioning measurements. The indication may be in one embodiment obtained via the LPP protocol. In another embodiment, the indication may be obtained via RRC before the release of the connection.

In yet another embodiment, the UE may obtain specific DRX/eDRX configurations from the network node, wherein the specific configurations shall only be used during the positioning measurements in idle mode. In one embodiment, the DRX/eDRX configurations may be obtained via the LPP protocol. In another embodiment, the configurations may be obtained from the MME via the network node before the release of the connection.

Action 420

The UE 330 performs positioning related measurements based on the obtained information.

Action 430

The UE 330 provides, to a network node, the positioning measurements.

Figure 5:
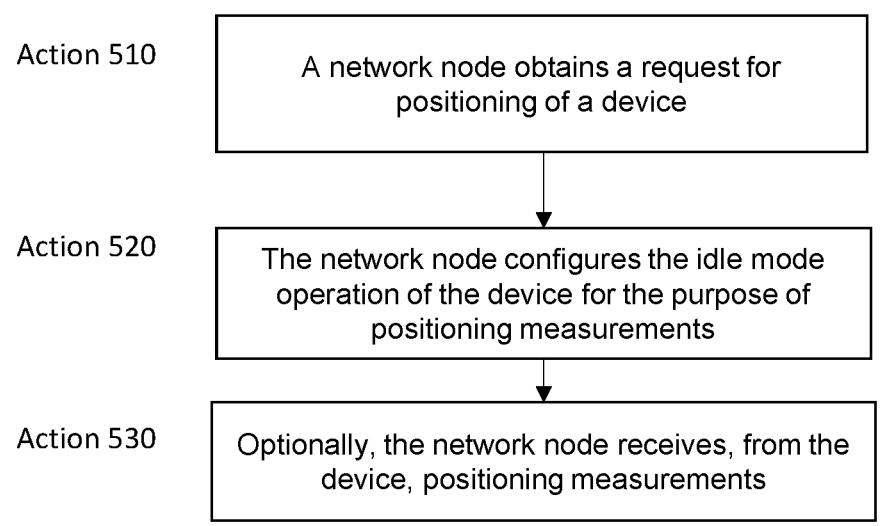
FIG. 5 is a flowchart depicting embodiments of a method performed in a network node.

FIG. 5 shows a flow chart of a method performed in a network node for positioning of a wireless communication device during idle mode in the wireless communication networks 300 according to the embodiments herein. It is assumed that the wireless communication device 330 is operating in the wireless communication networks served by a NW node, e.g. the first Access Node 320 in the first cell 310 for communication before it is released to idle mode. The method comprises the following actions, which actions may be taken in any suitable order:

Action 510

The network node 320 receives a request for positioning of a wireless communication device.

Action 520

The network node 320 configures a specific configuration associated with positioning measurements to be performed in idle mode for the wireless communication device 330.

The network node 320 sends the specific configuration to the wireless communication device 330.

Action 530

The network node 320 may optionally receive positioning measurements from the wireless communication device 330.

The specific configuration associated with positioning measurements may be specific DRX configuration and/or specific cell reselection measurement criteria or non-serving cell evaluation criteria as discussed above, and all alternatives embodiments related to the specific DRX configuration and/or specific cell reselection measurement criteria may be applied to the network node.

Figure 6:
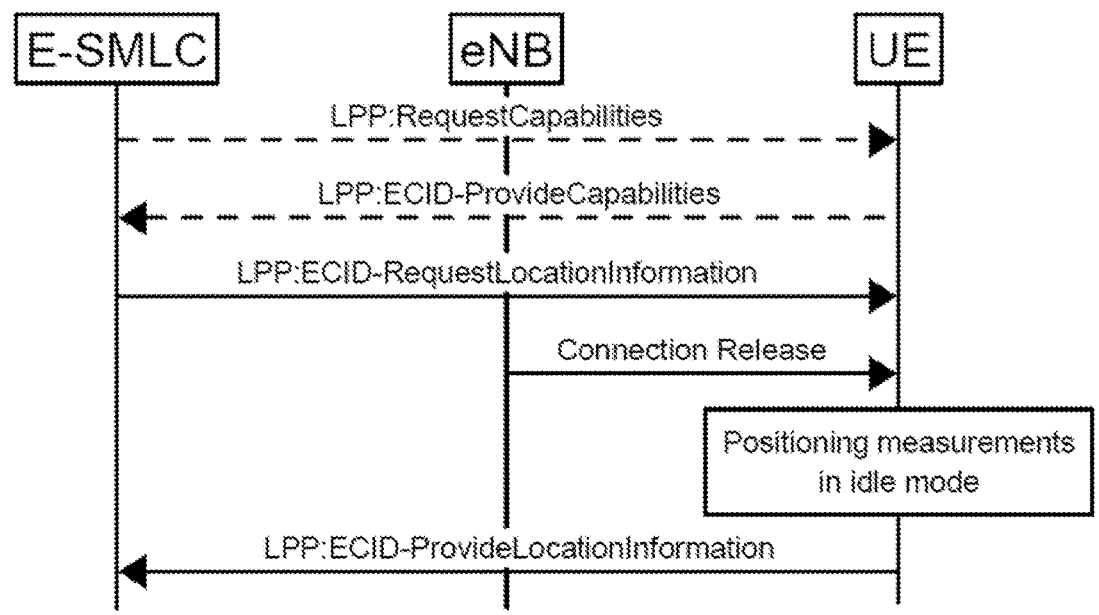
FIG. 6 is a signalling chart according to embodiments herein.

FIG. 6 illustrates a signaling chart in case measurement gaps are configured. The signaling chart may be extended with an indication e.g. via an LPP OTDOA Request Location Info message or a RRC Connection Release. The indication comprises neglecting the cell reselection measurement criteria and/or the DRX/eDRX configuration during idle mode positioning measurements.

Optionally, the network node 320 may request capability information from the wireless communication device 330, e.g. via a LPP:RequestCapabilities message, to which the wireless communication device will respond, e.g. via a LPP:ProvideCapabilities message, for example in particular a LPP:ECID-ProvideCapabilities message to inform about its specific supported functionalities, features, measurements and procedures. Positioning may be initiated by the network node 320 via a LPP request location information message, for example a LPP:ECID-RequestLocationInformation message to configure the wireless communication device 330 with what measurements and location information are needed. The wireless communication device 330 will await a release of the communication connection before engaging in positioning measurements in idle mode. Once the measurements are completed, the wireless communication device 330 will reconnect to the network node and send the positioning measurements, for example via a LPP:ECID-ProvideLocationInformation message.

To summarize above discussions, embodiments herein provide an exception of the normal idle mode operation for the purpose of efficient positioning measurements. Advantages of the embodiments herein include avoiding an inefficient and insufficient measurement period for positioning during the response time in idle mode, guaranteeing the UE is fully committed to positioning measurements of both serving and no-serving cells during the measurement time for positioning.

Figure 7:
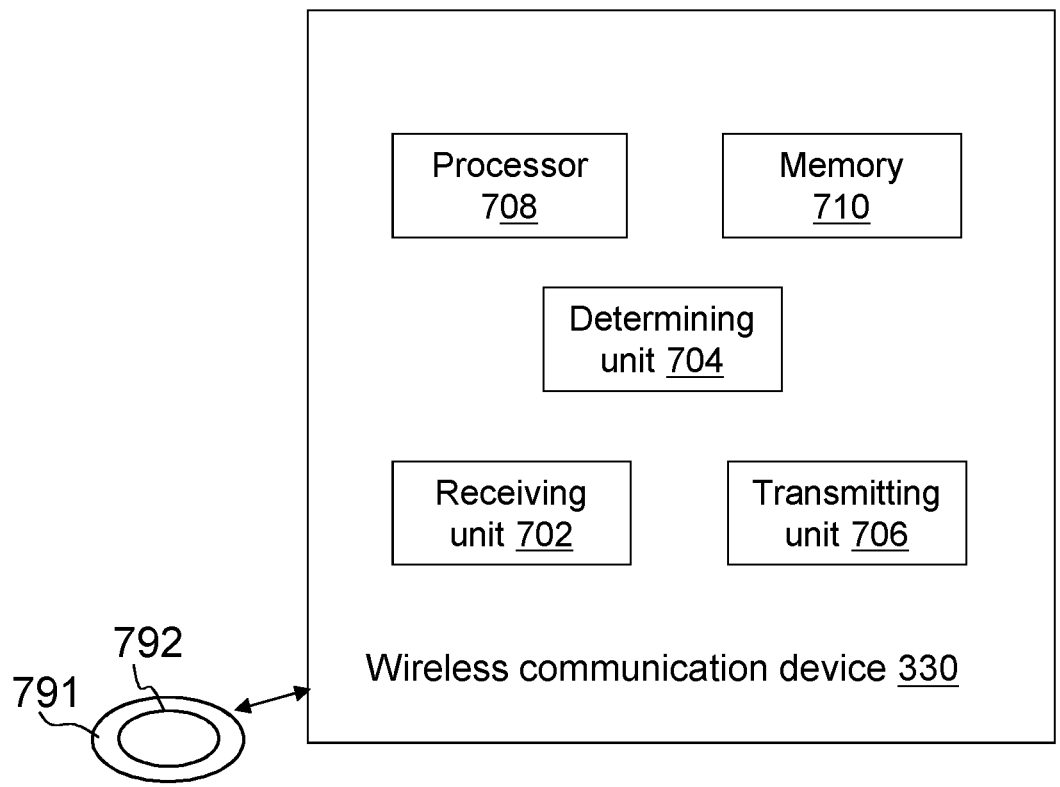
FIG. 7 is a schematic block diagram illustrating embodiments of a wireless communication device.

To perform the method actions in the wireless communication device 330 for positioning related measurements during idle mode in the wireless communication network 100 described above in relation to FIG. 4, the wireless communication device 330 comprises circuits or units as depicted in FIG. 7. The wireless communication device 330 comprises e.g. a receiving unit 702, a determining unit 704, a transmitting unit 706, a processor 708 and a memory 710.

The wireless communication device 330 is configured to, e.g. by means of the receiving unit 702 being configured to, obtain information on a specific configuration associated with positioning measurements to be performed in idle mode.

The wireless communication device 330 is further configured to perform positioning related measurements based on the obtained information and provide positioning related measurements to the first network node 320.

Those skilled in the art will appreciate that the receiving unit 702, the determining unit 704 and the transmitting unit 706 described above in the wireless communication device 330 may be referred to one circuit/unit, a combination of analog and digital circuits, one or more processors configured with software and/or firmware and/or any other digital hardware performing the function of each circuit/unit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The embodiments herein for the wireless communication device 330 to perform positioning related measurements during idle mode in the wireless communication network 300, may be implemented through one or more processors, such as the processor 708 in the wireless communication device 130, together with computer program code for performing the functions and actions of the embodiments herein. The program code mentioned above may also be provided as a computer program product, for instance in the form of a data carrier 791 carrying computer program code 792 for performing the embodiments herein when being loaded into the wireless communication device 330. One such carrier may be in the form of a CD ROM disc. It is however feasible with other data carriers such as a memory stick. The computer program code 792 may furthermore be provided as pure program code on the cloud and downloaded to the wireless communication device 330.

Figure 8:
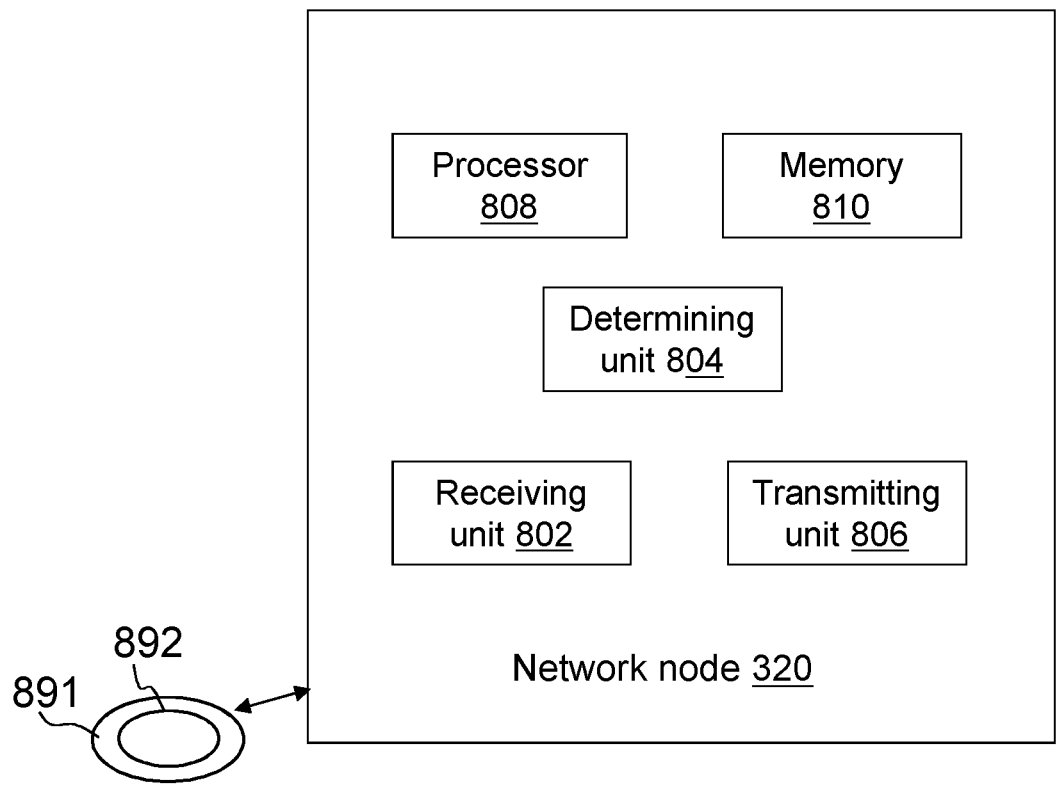
FIG. 8 is a schematic block diagram illustrating embodiments of a network node.

To perform the method actions in the network node 320 for positioning of a wireless device during idle mode in the wireless communication network 300 described above in relation to FIG. 5, the network node 320 comprises circuits or units as depicted in FIG. 8. The network node 320 comprises e.g. a receiving unit 802, a determining unit 804, a transmitting unit 806, a processor 808 and a memory 810.

The network node 320 is configured to, e.g. by means of the receiving unit 802 being configured to, receive a request for positioning of a wireless communication device. The network node 120 is further configured to configure a specific configuration associated with positioning measurements to be performed in idle mode for the wireless communication device, and send the specific configuration to the wireless communication device.

Those skilled in the art will appreciate that the receiving unit 802, the determining unit 804 and the transmitting unit 806 described above in the network node 320 may be referred to one circuit/unit, a combination of analog and digital circuits, one or more processors configured with software and/or firmware and/or any other digital hardware performing the function of each circuit/unit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The embodiments herein for positioning of a wireless communication device during idle mode in the wireless communication network 300, may be implemented through one or more processors, such as the processor 808 in the network node 320, together with computer program code for performing the functions and actions of the embodiments herein. The program code mentioned above may also be provided as a computer program product, for instance in the form of a data carrier 891 carrying computer program code 892 for performing the embodiments herein when being loaded into the network node. One such carrier may be in the form of a CD ROM disc. It is however feasible with other data carriers such as a memory stick. The computer program code 892 may furthermore be provided as pure program code on the cloud and downloaded to the network node 320.

The memory 710 in the wireless communication device 330 and the memory 810 in the network node 320 may comprise one or more memory units and may be arranged to be used to store information, look up tables, historic lists, data, configurations and applications to perform the methods herein when being executed in the wireless communication device 330/the network node 320.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method performed in a wireless communication device configured for operation in a wireless communication network, the method comprising:
   performing neighbor-cell measurements in an idle mode according to a triggering threshold defined for cell reselection during the idle mode, and triggering cell reselection in dependence on the neighbor-cell measurements;
   performing additional neighbor-cell measurements during the idle mode according to a modified or nullified version of the triggering threshold, wherein the additional neighbor-cell measurements support positioning of the wireless communication device and do not trigger cell reselection by the wireless communication device; and
   providing the additional neighbor-cell measurements to a first network node of the wireless communication network.

2. The method according to claim 1, further comprising modifying or ignoring a Discontinuous (DRX) configuration of the wireless communication device, for performing the additional neighbor-cell measurements.

3. The method according to claim 1, wherein a system information block broadcasted from the first network node indicates the triggering threshold as a cell reselection measurement criterion, and wherein the method further comprises receiving information from the first network node, indicating that the wireless communication device should modify the triggering threshold for performing the additional neighbor-cell measurements, as said modified version of the triggering threshold, or indicating that the wireless communication device should ignore the triggering threshold, as said nullified version of the triggering threshold.

4. The method according to claim 3, wherein, in a case where the information from the first network node indicates that the wireless communication device should modify the triggering threshold for performing the additional neighbor-cell measurements, the information indicates a modified triggering threshold to be used by the wireless communication device for performing the additional neighbor-cell measurements.

5. The method according to claim 3, further comprising receiving the information via a Long Term Evolution Positioning Protocol (LPP) or via Radio Resource Control (RRC), before a release of a connection with the first network node.

6. The method according to claim 1, wherein the wireless communication device stores configuration information that controls whether the wireless device ignores the triggering threshold, as said nullified version of the triggering threshold, or modifies the triggering threshold, as said modified version of the triggering threshold.

7. The method according to claim 1, further comprising, based on pre-configured information in the wireless communication device, ignoring a Discontinuous Reception (DRX) configuration of the wireless communication device in idle mode, for performing the additional neighbor-cell measurements.

8. The method according to claim 1, further comprising obtaining a specific Discontinuous Reception (DRX) configuration via a Long Term Evolution Positioning Protocol (LPP) or from a Mobility Management Entity (MME) via the first network node before release of a connection with the first network node, for use in performing the additional neighbor-cell measurements.

9. A wireless communication device configured for operation in a wireless communication network, the wireless communication device comprising:
   a processor and a memory, the memory storing instructions that are executable by the processor whereby the wireless communication device is configured to:
     perform neighbor-cell measurements in an idle mode according to a triggering threshold defined for cell reselection during the idle mode, and trigger cell reselection in dependence on the neighbor-cell measurements;
     perform additional neighbor-cell measurements during the idle mode according to a modified or nullified version of the triggering threshold, wherein the additional neighbor-cell measurements support positioning of the wireless communication device and do not trigger cell reselection by the wireless communication device; and
     provide the additional neighbor-cell measurements to a first network node of the wireless communication network.

10. The wireless communication device according to claim 9, wherein the wireless communication device is further configured to ignore or modify a Discontinuous Reception (DRX) configuration of the wireless communication device, for performing the additional neighbor-cell measurements.

11. The wireless communication device according to claim 9, wherein a system information block broadcasted from the first network node indicates the triggering threshold as a cell reselection measurement criterion, and wherein the wireless communication device is further configured to receive information from the first network node, indicating that the wireless communication device should modify the triggering threshold for performing the additional neighbor-cell measurements, as said modified version of the triggering threshold, or indicating that the wireless communication device should ignore the triggering threshold, as said nullified version of the triggering threshold.

12. The wireless communication device according to claim 11, wherein, in a case where the information from the first network node indicates that the wireless communication device should modify the triggering threshold for performing the additional neighbor-cell measurements, the information indicates a modified triggering threshold to be used by the wireless communication device for performing the additional neighbor-cell measurements.

13. A method performed in a network node of a wireless communication network, the method comprising:
   transmitting signaling that indicates a triggering threshold to be used by a wireless communication device for performing neighbor-cell measurements for cell reselection during operation of the wireless communication device in an idle mode;
   receiving a request for positioning of the wireless communication device;
   transmitting further signaling that indicates a modified or nullified version of the triggering threshold to be used by the wireless device for performing additional neighbor-cell measurements during the idle mode, to support positioning of the wireless communication device, and wherein the additional neighbor-cell measurements do not trigger cell reselection by the wireless communication device; and
   receiving the additional neighbor-cell measurements from the wireless communication device, for use in determining a position of the wireless communication device.

14. A network node configured for operation in a wireless communication network, the network node comprising:
   a processor and a memory, the memory storing instructions that are executable by the processor whereby the network node is configured to:
     transmit signaling that indicates a triggering threshold to be used by a wireless communication device for performing neighbor-cell measurements for cell reselection during operation of the wireless communication device in an idle mode;
     receive a request for positioning of the wireless communication device;
     transmit further signaling that indicates a modified or nullified version of the triggering threshold to be used by the wireless device for performing additional neighbor-cell measurements during the idle mode, to support positioning of the wireless communication device, and wherein the additional neighbor-cell measurements do not trigger cell reselection by the wireless communication device; and
     receive the additional neighbor-cell measurements from the wireless communication device, for determining a position of the wireless communication device.

\* \* \* \* \*